March 2, 1971  F. A. McWHORTER  3,566,476
METHOD OF AND APPARATUS FOR VEHICLE AXLE CORRECTION
Filed June 11, 1968  2 Sheets-Sheet 1
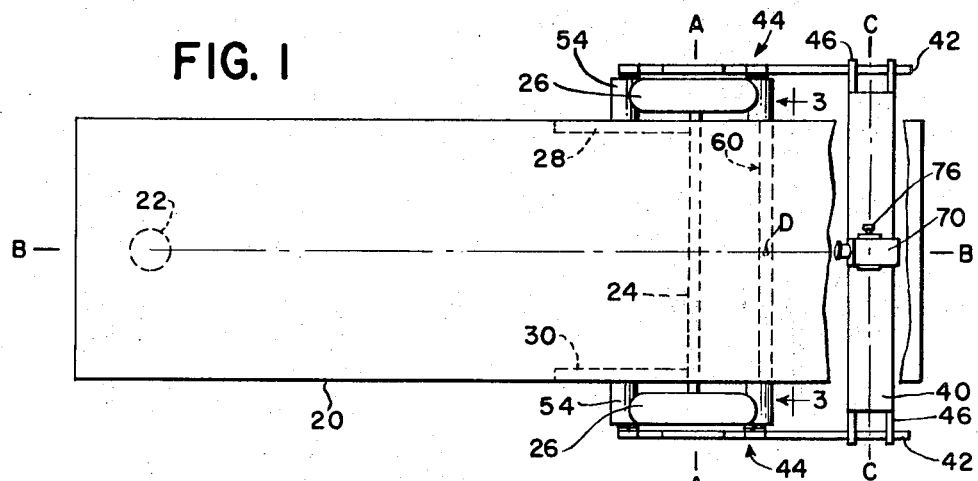
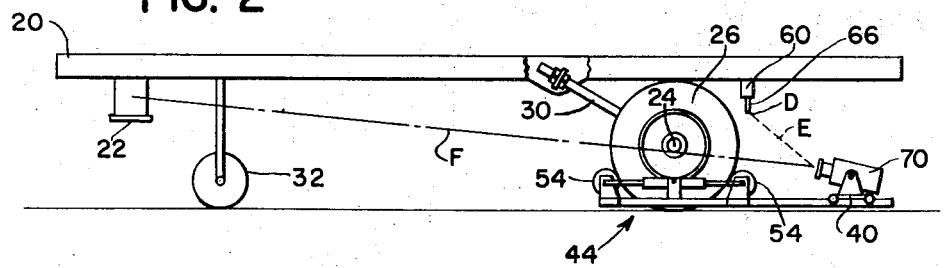
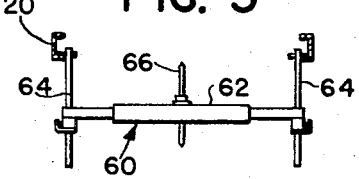
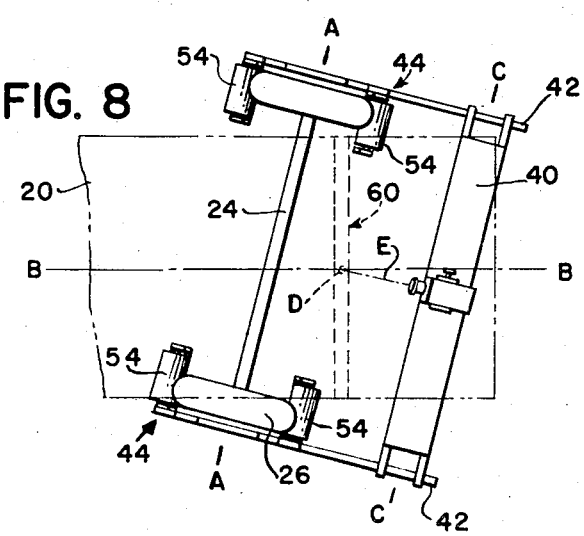
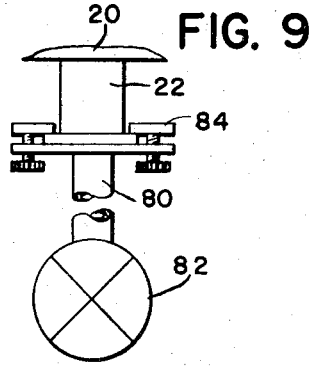
*INVENTOR.*
F. A. McWHORTER

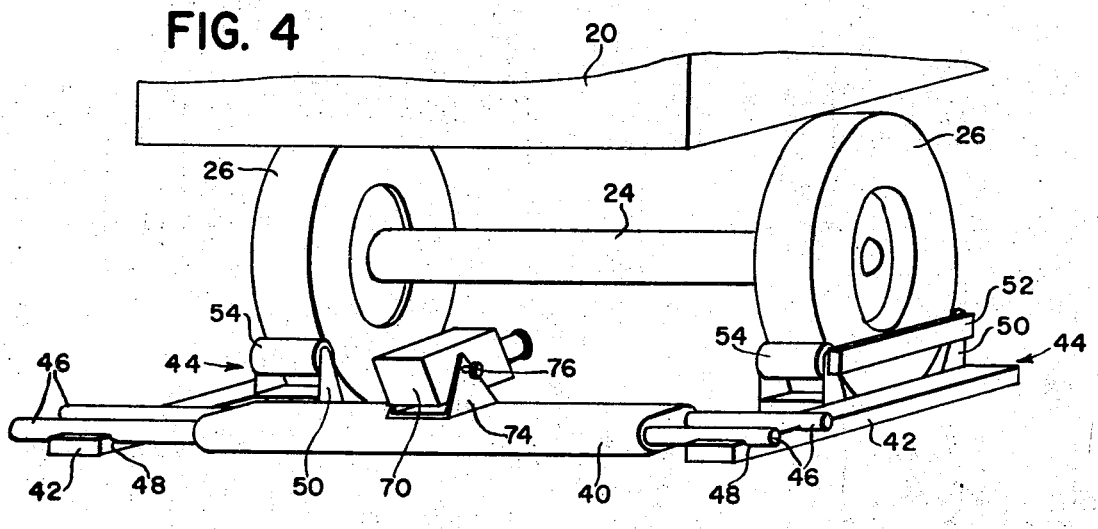
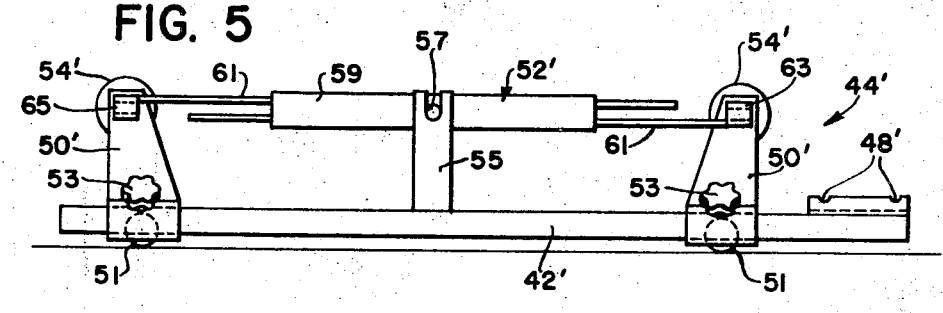
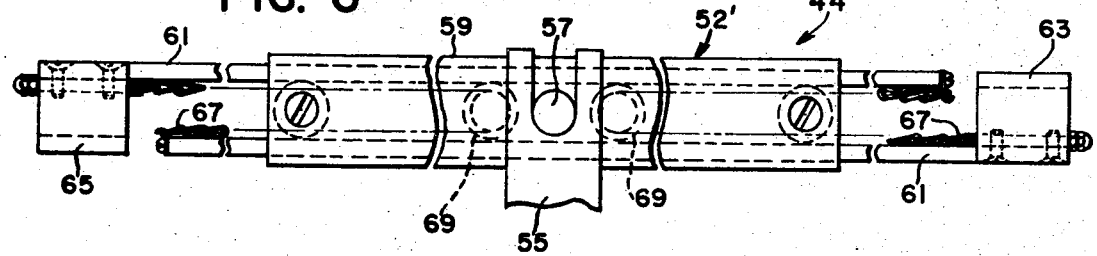
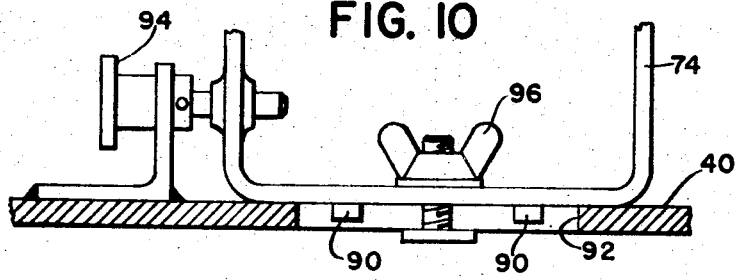

United States Patent Office 3,566,476
Patented Mar. 2, 1971

3,566,476
METHOD OF AND APPARATUS FOR VEHICLE AXLE CORRECTION
Fred Awbrey McWhorter, Davenport, Iowa, assignor to Bee Line Company, Davenport, Iowa
Filed June 11, 1968, Ser. No. 736,041
Int. Cl. G01c *15/12*
U.S. Cl. 33—46                                   12 Claims

ABSTRACT OF THE DISCLOSURE

A method of and apparatus for ascertaining and correcting perpendicularity of a vehicle axle to the fore-and-aft centerline of the vehicle frame or body by projecting a beam from a reference line parallel to the axle and correctively adjusting the reference line until the beam centers on a preselected reference point on the centerline so that the axle correctly tracks with the frame, especially in semi-trailers and the like.

BACKGROUND OF THE INVENTION

In the case of the so-called tractor and semi-trailer, the latter often fails to properly track or trail the former because of semitrailer axle misalinement; i.e., the axle is not perpendicular to the fore-and-aft centerline of the frame, and consequently the trailer runs in somewhat laterally offset relation to the tractor, resulting not only in excess tire wear but also in lapping over either the centerline of the road or the shoulder. Attempts in the past to correct this have relied upon centering on the axle housing or axle itself without proper attention to a preselected reference point on the trailer—such as the king pin—and as a result proper perpendicularity has not been attained. Moreover, new vehicles are not always properly orientated as to frame-kingpin-axle relationship and premature tire wear etc. has resulted before the problem has been detected. The same problems have occurred even in multiple-axle vehicles, causing not only the above disadvantages but also those stemming from corrective steering on the part of the driver, resulting in driver fatigue, undue loads on the steering mechanism, etc.

SUMMARY OF THE INVENTION

According to the present invention, true axle perpendicularity to the centerline of the frame or body is attained by establishing a reference line parallel to the axle, projecting a perpendicular from this line to a first reference point on the centerline of the frame in proximity to the axle and then projecting this perpendicular to a remote second reference point on the frame centerline. If the projected perpendicular does not intersect or impinge on this second point, the axle is angularly adjusted until intersection or impingement is achieved. Projection of the beam is achieved by a ray or stream of energy such as light from a projector which projects an index image visible on the reference points. In the preliminary phase of the arrangement, the projector is centered not on the axle but on a reference point on the frame. The base or reference line is accomplished by gaging from the wheel periphery and the gaging means includes centering means enabling compensation for differences in wheel diameters, as where one tire is smaller, because of wear, etc., than the tire on the opposite wheel. A further feature, especially useful in the case of semitrailers having suspended structures amidships, such as refrigeration units, etc., is the use of a detachable kingpin extension on which the projected perpendicular may impinge.

DESCRIPTION OF THE DRAWINGS

FIG. 1 is a representative plan, with portions broken away, showing the basic concepts of the invention;
FIG. 2 is a side view of the same;
FIG. 3 is a section on the line 3—3 of FIG. 1;
FIG. 4 is an enlarged perspective of the wheel-gage relationship;
FIG. 5 is a side elevation of a modified wheel-gage structure;
FIG. 6 is an enlarged plan, with portions broken away, of the structure of FIG. 5;
FIG. 7 is an enlarged front view of the projecting device;
FIG. 8 is a fragmentary plan, showing in exaggerated fashion a case of axle dislocation;
FIG. 9 is a fragmentary enlarged view of a detachable kingpin extension; and
FIG. 10 is a fragmentary view of one form of structure that may be used to secure fine lateral adjustment of the projector.

DESCRIPTION OF A PREFERRED EMBODIMENT

Although the invention may be exploited in vehicles of various types, it has especial utility in ascertaining and correcting axle problems in semitrailers, and accordingly the disclosure will be devoted to that background as representative. The drawings illustrate a typical semitrailer having a longitudinal or fore-and-aft main structure 20 such as a chassis or body provided at its forward end with a conventional kingpin 22 for reception by the usual tractor fifth wheel (not shown) and carried at its rear end by axle means including a transverse axle 24 and right and left hand wheels 26, it being noted here that the expression "wheel" includes not only the wheel body and hub but also the usual tire, the whole being typical of a circle about the axis A—A of the axle. Also typical of semitrailer construction are a pair of radius rods 28 and 30, at least the latter of which is adjustable fore-and-aft for the purpose of achieving perpendicularity of the axle 24 to the fore-and-aft centerline B—B of the frame or main structure 20. Theoretically, a new vehicle should have its axle adjusted to be perpendicular to the fore-and-aft centerline and its wheels 26 equidistantly spaced laterally from this centerline so that the trailer tracks perfectly on the tractor via the kingpin 22. Such originally assumed adjustment takes into account the proper relationship of springs, spring seats, shackles etc. Aside from imperfections in original alinement, normal usage of the vehicle creates dislocation because of wear, distortion caused by striking of curbs, accidents etc., all of which causes a condition in which the axis A—A of the axle assumes other than a 90° angle to the frame centerline B—B, such as shown in exaggerated fashion in FIG. 8. In such a situation, since the wheels 26 tend to run parallel to a line perpendicular to the axle and intersecting the kingpin 22, but not centered on the vehicle as a whole, the semitrailer assumes an angular position relative to the towing tractor and runs "dogwise" down the road, the trailer lapping to right or left, depending upon the direction of misalinement. If the dislocation is serious, the tractor driver tends to compensate and this imposes an undue strain not only upon him but upon the tractor steering mechanism and, if not compensated, causes undue wear on the trailer tires, bearings etc. It is therefore desirable to correct the misalinement or dislocation, and, regardless of the method used, it is preferable to accomplish this on the trailer as disconnected from the tractor, in which case the trailer will be supported on the wheels 26 as well as by the usual landing wheel carriage 32 (FIG. 2).

The apparatus for ascertaining axle dislocation, and for correcting same if it exists, includes an elongated transverse support means 40 carried at its opposite ends on longitudinal members 42 forming respective parts of wheel gaging means 44. In a simplified form of wheel gage (FIGS. 1, 2, 4 and 8), the members 42 lie on the floor in parallelism respectively alongside the outer faces of the wheels 26 and these members and the support 40 are precision fashioned so as to key together to establish a 90° angle between each member 42 and the support 40, the ends of the support preferably being in the form of parallel rods 46 that lie respectively in machined slots 48 in the members 42, thus allowing lateral adjustment of the support relative to the members but at all times retaining the original geometry as respects perpendicularity. Each member 42 rigidly carries a pair of longitudinally spaced apart ears 50, interconnected by a fore-and-aft brace 52 to maintain the spacing, and each ear carries a wheel-engaging portion or roller 54 which contacts the wheel periphery at portions lying on a horizontal fore-and-aft chord.

In this arrangement, and assuming that the diameters of the wheels 26 are the same, and noting that the gages 44 are exactly symmetrical, it follows that gaging is achieved from the axis A—A of the axle 24, because a vertical perpendicular from this axis bisects the chord at each end of the axle (at the wheels) as established by the spaced apart rollers 54 engaging the wheel peripheries. Further, the support slots 48 are identically spaced from the roller arrangement and this sets the support 40 in parallelism with the axle 24 so that a line parallel to the length of the support 40, such as the line C—C (FIG. 1) may be used as a reference line parallel to the axis A—A of the axle. The structure thus places the line C—C in spaced relation to the axle where it is easier to use, and the line C—C also provides a reference of geometrical accuracy and eliminates the need for complicated gages applied to the axle itself, which would involve operations directly beneath the vehicle.

If the further assumptions are made that the vehicle main structure 20 is accurate and that the axle 24 and wheels 26 are properly oriented, it will follow that the fore-and-aft centerline B—B of the main structure 20 will intersect the axle axis A—A at a midpoint of the latter, the axis A—A will be perpendicular to the centerline B—B and the wheels 26 will run in vertical radial planes normal to the axis A—A, all of which means that the vehicle will properly track the towing vehicle, since the kingpin 22 also lies on the centerline B—B. Since it has been determined from the foregoing, on the basis of the construction of the gage means 44 and support 42, that the reference line C—C is parallel to the axle axis A—A, it follows that this line C—C will also be perpendicular to the centerline B—B.

Consequently, with the gaging apparatus in place for checking orientation of the axle etc., if the axle is shifted out of its proper relationship (shown in exaggerated fashion in FIG. 8), the axis A—A is no longer perpendicular to the centerline B—B, and neither is the line C—C. Further, any line perpendicular to the line C—C, and thus also perpendicular to the axis A—A will be non-parallel to the centerline B—B and any such line projected perpendicularly from a midpoint of the line C—C will not intersect the kingpin 22. It is therefore necessary to adjust the axle by means of its radius rods 28 and 30 to restore the ideal conditions shown in FIG. 1, and this is done by use of central reference points on the vehicle as related to the gaging and support means.

In the case of a semitrailer, one reference point will be the forward kingpin 22, assumed normally to retain its original central position. If this is suspect, however, suitable adjustments may be made to establish it as a reference point which, being at the forward end of the vehicle, is of course relatively remote from the axle and wheels. In vehicles other than semitrailers, or where a kingpin or some other built-in central reference point is not available, a temporary reference point may be easily established by any known means and method, such as by use of a frame gage of the type shown in the U.S. Pat. to Jacobsen et al., No. 2,581,021. Such type of gage is shown here at 60, employed in proximity to the axle 24 to establish a second reference point D which, in the ideal conditions assumed in FIG. 1, lies on the vehicle centerline B—B. As best shown in FIG. 3, the gage 60 comprises a telescopic transverse structure 62 suspended from the laterally opposite rails of the frame 20 by hangers 64 and having a center vertical rod 66 which establishes the reference point D. It is a characteristic of a gage of this type that lateral adjustment thereof to compensate for differences in width of vehicle frames always leaves the rods 66, and thus the point D, exactly midway between the frame rails. The Jacobsen gage is a precision device and also includes provision for levelling of the structure 62 to assure the minimizing of error.

Having established the rear reference point D by use of the gage, a line E is now projected between the point D and the reference line C—C and at right angles to the latter. Stated otherwise, the point D is in effect transferred to the line C—C as a base point. In the preferred apparatus and method, the line E is projected by an energy-transmitting device, here a light projector 70 having therein an index image 72 (FIG. 7) which represents the above base point and which is projectible distantly by the light beam, just as any image or picture is projectible on a distant screen. The projector is accurately mounted on the support by a fixed bracket 74 so that the light beam projected is exactly and permanently perpendicular to the reference line C—C; although, provision is made at 76 for selectively tilting the projector about an axis exactly parallel to the line C—C. The means at 76 also includes a releasable lock (not shown in detail) for securing the angle of the projected beam to the horizontal, but this beam may not deviate from its right-angular relationship to the line C—C.

As stated above, the support 40, to which the projector 40 is attached by the bracket 74, may be shifted laterally at 46-48 relative to the wheel gages 44, this for the purpose of centering the beam (line E) on the point D via the index line 72 (FIG. 8). This, then, centers the projector on the center of the frame at the rear reference point D and the line E is automatically perpendicular to not only the line C—C but to the axle axis A—A. The projector is now tilted downwardly to clear the axle 24 so that the beam is projected forwardly to the front reference point established by the kingpin 22 or its equivalent, such step being illustrated in FIG. 2 where the projection of the longer beam or extended perpendicular is represented by the line F. As will be seen from the exaggerated illustration in FIG. 8, the line F will clearly miss impingement on the kingpin 22, but adjustment of the axle by means of the radius rod arrangement will restore the proper transverse position of the axle means and, since the gages 44 and support retain their relationships to the axle means, the line C—C will be brought back into its right-angular relationship to the centerline B—B. As this adjustment is being accomplished the beam F is gradually swinging toward the kingpin 22 and when the projected image line 72 is seen on the kingpin, proper orientation has been achieved and the apparatus may be removed and the vehicle taken away.

In cases of vehicles equipped with low-slung components such as heaters, refrigerator equipment etc. that would block the beam F, a kingpin extension 80 is made available (FIG. 9). This is in the form of a rod having a suitable target 82 at its lower end and detachable means 84 at its upper end for temporary but accurately coaxial mounting on the kingpin as a depending extension of the kingpin 22 so that the beam F can be projected beneath underslung equipment such as noted above.

In a modified form of projector mounting, provision may be made for fine adjustment laterally (FIG. 10). Here the bracket 74 is accurately guided on the support by pins 90 and a slot 92 for limited sliding movement by means of a fine adjustment screw 94. The selected position of the projector may be accomplished by a clamping means 96.

To accommodate differences in wheel diameters, it is preferred to use wheel gages of the modified adjustable or compensating type as at 44' in FIGS. 5 and 6. In each such gage, a fore-and-aft member 42' is provided at one end with a rigidly affixed pad having support-and-receiving slots 48' like those previously described at 48. A pair of brackets 50' slide on the member 42', each being carried on floor-engaging rollers 51 and each being releasably lockable to the member 42' by clamping means 53. Each bracket also carries a wheel-engaging roller 54' like and for the same purpose as the rollers 54. Rigidly affixed to and rising from the member 42', intermediate the roller brackets 50', is a standard 55, slotted at its top end to receive a pin 57 of a fore-and-aft telescopic structure 52' that operates fundamentally on the principle of the frame gage 60 described above. That is to say, the structure 52' has a central housing 59 in which are slidably guided a pair of longitudinal parallel bars 61, the top one of which is connected at its rear end at 63 to the rear roller brackets 50' and the lower one of which is connected at 65 to the front roller bracket 50'. The bars are interconnected with each other and to the housing 59 by a system of chains 67 and rollers 69 as in the Jacobsen patent so that fore-and-aft movement of either bar 61 imparts equal and opposite movement to the other bar, the chain and roller system operating as equalizing or centering means so that regardless of the spacing between the rollers 54', as for wheels of different diameters, the standard 55 is always midway between the roller 54' and the distance between this standard and the slots 48' never varies. Therefore, where two symmetrical gages 44' are used, the reference line C—C is always equidistant at each end thereof from the standards 55 and since these standards represent vertical lines perpendicular to midpoints on the horizontal chords established by the rollers 54' as to the wheels 26, it follows that the line C—C will be parallel to the axle axis A—A. The floor-engaging rollers 51 enable free movement of the roller brackets 50' as the gages are accommodated to the wheels, following which the gages are locked up by the means 53 to retain the selected relationship.

I claim:

1. For use on a vehicle having a chassis including opposite front and rear ends and carried by transverse wheeled axle means adjacent to one of said ends, the method of ascertaining and securing perpendicularity of the axis of the axle means to the longitudinal centerline of said chassis, comprising: gaging longitudinally from the axle means to establish a reference line proximate to but spaced from and parallel with said axis, locating a first reference point on the centerline of said chassis in the vicinity of and spaced from the axle means, projecting a straight line between said first reference point and said reference line at 90° to said reference line to establish a base point on said reference line, observing a second reference point on the centerline of said chassis adjacent to the other end of the chassis remote from said first reference point and from said base point, extending said perpendicular line from said base point and through said first reference point toward said remote end and observing the intersection or non-intersection of said perpendicular line with said second reference point, and, in the case of non-intersection, adjusting the angular relation of the axle means to said centerline of the chassis until said perpendicular line passes through the base point, the first reference point and the second reference point.

2. The invention defined in claim 1 in which gaging from the axle means for said reference line is accomplished by gaging from peripherial portions of each wheel lying at opposite ends of a fore-and-aft chord through each wheel that is parallel to and spaced substantially above the ground or floor on which such wheel is supported and compensating for differences in diameter of the wheels at opposite ends of the axle means so that the reference line is parallel to the wheel means axis.

3. For use on a vehicle having a chassis including opposite front and rear ends and carried by transverse wheeled axle means adjacent to one of said ends, apparatus for ascertaining and securing perpendicularity of the axis of the axle means to the longitudinal centerline of the chassis, comprising: support means positionable in longitudinally spaced relation to the axle means and including gaging means for gaging longitudinally from the axle means to establish on the support means a reference line proximate to but spaced from and parallel to the axle means axis, means mountable on the chassis for locating a first reference point on the centerline of said chassis in the vicinity of and spaced from the axle means, projector means for projecting a straight line between said first reference point and said reference line at 90° to said reference line to locate the projector means on a base point on said reference line, said projector means being operative to project a straight line perpendicular to said base point through said first reference point to a second reference point on the centerline of said chassis adjacent to the other end of said chassis to enable the observation of intersection or non-intersection of said projected line with said second reference point, whereby, in the case of such non-intersection, the angular relation of the axle means to the centerline of said chassis may be adjusted until the base point, first reference point and second reference point lie on the centerline of said chassis with said axle means axis at 90° to said centerline.

4. The invention defined in claim 3, in which the support means includes an elongated carrier transverse to the length of said chassis and on which said reference line is established and longitudinal gaging means at each end thereof, and the projector means is mounted on said carrier, each gaging means including longitudinally spaced portions for engaging peripheral portions of the associated wheel that lie at opposite ends of a chord through said wheel that is spaced substantially above and parallel to the ground or support on which the vehicle is carried, each of said gaging means including a centering device compensating for differences in diameter of the wheel means and assuring parallelism between said carrier and the wheel means axis.

5. The invention defined in claim 4 in which the carrier is adjustable transversely of the centerline of said chassis along with the projector means to locate the projector means initially with respect to said first reference point, and adjusting means is provided between said carrier and said projector means for enabling fine adjustment of the projector means with respect to said first reference point.

6. The invention defined in claim 4 in which each gaging means is carried by floor-engaging rollers to facilitate operation of the centering device.

7. For use on a vehicle having a body including opposite front and rear ends and carried by transverse wheeled axle means adjacent to one of said ends, the method of ascertaining and securing perpendicularity of the axis of the axle means to the longitudinal centerline of said body, comprising: gaging longitudinally from the axle means to establish a reference line proximate to but spaced from and parallel with said axis, locating a first reference point on the centerline of said body in the vicinity of and spaced from the axle means, projecting a straight line between said first reference point and said reference line at 90° to said reference line to establish a base point on said reference line, observing a second reference point on the centerline of said body adjacent to the other end of the body remote from said first reference point and from said base point, extending said perpendicular line from said base point and through said first reference point toward said remote end and observing the intersection or non-intersection of said perpendicular line with said second reference point, and, in the case of non-intersection, adjusting the angular relation of the axle means to said centerline of the body until said perpendicular line passes through the base point, the first reference point and the second reference point.

8. The invention defined in claim 7 in which gaging from the axle means for said reference line is accomplished by gaging from peripheral portions of each wheel lying at opposite ends of a fore-and-aft chord through each wheel that is parallel to and spaced substantially above the ground or floor on which such wheel is supported and compensating for differences in diameter of the wheels at opposite ends of the axle means so that the reference line is parallel to the wheel means axis.

9. For use on a vehicle having a body including opposite front and rear ends and carried by transverse wheeled axle means adjacent to one of said ends, apparatus for ascertaining and securing perpendicularity of the axis of the axle means to the longitudinal centerline of the body, comprising: support means positionable in longitudinally spaced relation to the axle means and including gaging means for gaging longitudinally from the axle means to establish on the support means a reference line proximate to but spaced from and parallel to the axle means axis, means mountable on the body for locating a first reference point on the centerline of said body in the vicinity of and spaced from the axle means, projector means for projecting a straight line between said first reference point and said reference line at 90° to said reference line to locate the projector means on a base point on said reference line, said projector means being operative to project a straight line perpendicular to said base point through said first reference point to a second reference point on the centerline of said body adjacent to the other end of said body to enable the observation of intersection or non-intersection of said projected line with said second reference point, whereby, in the case of such non-intersection, the angular relation of the axle means to the centerline of said body may be adjusted until the base point, first reference point and second reference point lie on the centerline of said body with said axle means axis at 90° to said centerline.

10. The invention defined in claim 9, in which the support means includes an elongated carrier transverse to the length of said body and on which said reference line is established and longitudinal gaging means at each end thereof, and the projector means is mounted on said carrier, each gaging means including longitudinally spaced portions for engaging peripheral portions of the associated wheel that lie at opposite ends of a chord through said wheel that is spaced substantially above and parallel to the ground or support on which the vehicle is carried, each of said gaging means including a centering device compensating for differences in diameter of the wheel means and assuring parallelism between said carrier and the wheel means axis.

11. The invention defined in claim 10 in which the carrier is adjustable transversely of the centerline of said body along the projector means to locate the projector means initially with respect to said first reference point, and adjusting means is provided between said carrier and said projector means for enabling fine adjustment of the projector means with respect to said first reference point.

12. The invention defined in claim 10 in which each engaging means is carried by floor-engaging rollers to facilitate operation of the centering device.

References Cited

UNITED STATES PATENTS

| | | | |
|---|---|---|---|
| 2,590,722 | 3/1952 | Otis | 33—193X |
| 3,137,076 | 6/1964 | Hurst | 33—203.12X |
| 3,162,950 | 12/1964 | Hykes | 33—46(.2W) |
| 3,325,905 | 6/1967 | Hurst | 33—193 |
| 3,398,453 | 8/1967 | Hurst | 33—46(.2W) |

WILLIAM D. MARTIN, JR., Primary Examiner

U.S. Cl. X.R.

33—193, 203.12